(12) United States Patent
Klimek

(10) Patent No.: US 8,550,498 B2
(45) Date of Patent: Oct. 8, 2013

(54) IMPACT-DAMPING STRUCTURE WITH CRASH BOXES

(75) Inventor: Stanislaw Klimek, Frankfurt (DE)

(73) Assignee: GM Global Technology Operations LLC, Detroit, MI (US)

( * ) Notice: Subject to any disclaimer, the term of this patent is extended or adjusted under 35 U.S.C. 154(b) by 124 days.

(21) Appl. No.: 13/166,473

(22) Filed: Jun. 22, 2011

(65) Prior Publication Data

US 2011/0309606 A1    Dec. 22, 2011

(30) Foreign Application Priority Data

Jun. 22, 2010 (DE) .......................... 10 2010 024 572

(51) Int. Cl.
*B60R 19/34* (2006.01)
*B60R 19/02* (2006.01)

(52) U.S. Cl.
USPC ............... 280/784; 296/35.2; 296/187.03; 296/187.09; 293/132; 293/133; 293/149

(58) Field of Classification Search
USPC ............ 280/784; 296/35.1, 35.2, 187.03, 296/187.09, 193.09, 203.01, 203.02, 205; 293/102, 121, 132, 133, 149, 154, 155
See application file for complete search history.

(56) References Cited

U.S. PATENT DOCUMENTS

| | | | | |
|---|---|---|---|---|
| 2,162,100 A | * | 6/1939 | McGregor | 293/115 |
| 2,835,348 A | * | 5/1958 | Sadtler | 188/371 |
| 3,865,418 A | * | 2/1975 | Saxl | 293/133 |
| 4,232,755 A | * | 11/1980 | Dow | 180/65.6 |
| 4,413,856 A | * | 11/1983 | McMahan et al. | 296/187.03 |
| 4,986,596 A | * | 1/1991 | Gohier | 296/203.01 |
| 5,103,529 A | * | 4/1992 | Konig | 16/2.1 |
| 5,242,200 A | * | 9/1993 | Kamm et al. | 293/126 |
| 5,362,102 A | * | 11/1994 | Hajek et al. | 280/751 |
| 5,588,511 A | * | 12/1996 | Kallenbach | 188/374 |
| 5,875,875 A | * | 3/1999 | Knotts | 188/374 |
| 6,174,009 B1 | * | 1/2001 | McKeon | 293/133 |
| 6,199,924 B1 | * | 3/2001 | Oguri et al. | 293/142 |
| 6,659,535 B2 | * | 12/2003 | Dohrmann | 296/133 |

(Continued)

FOREIGN PATENT DOCUMENTS

| | | |
|---|---|---|
| DE | 19545069 A1 | 4/1997 |
| DE | 19744274 A1 | 4/1999 |

(Continued)

OTHER PUBLICATIONS

Curious Inventor, 'Tutorial on Choosing Screw Type, Size, Strength' [online]. [Retrieved via Web Archive Jun. 11, 2010]. Retrieved from the Internet <URL: http://web.archive.org/web/20100611153811/http://store.curiousinventor.com/guides/Metal_Working/Screws>.*

(Continued)

*Primary Examiner* — Joseph Rocca
*Assistant Examiner* — Barry Gooden, Jr.
(74) *Attorney, Agent, or Firm* — Ingrassia Fisher & Lorenz, P.C.

(57) ABSTRACT

An impact-damping structure with crash boxes is provided with an extension of the ends of the chassis members of a vehicle to a transverse impact member. An extension pipe with a towing lug that aligns flush with the chassis member is arranged in a center of one of the crash boxes. The extension pipe is connected with the end of the chassis member via a spreading device of the crash box.

14 Claims, 4 Drawing Sheets

(56) References Cited

U.S. PATENT DOCUMENTS

| | | | |
|---|---|---|---|
| 6,712,411 B2* | 3/2004 | Gotanda et al. | 293/155 |
| 6,923,484 B2* | 8/2005 | Braun et al. | 293/155 |
| 6,929,297 B2* | 8/2005 | Muller et al. | 293/133 |
| 7,000,975 B2 | 2/2006 | Haneda et al. | |
| 7,413,226 B2* | 8/2008 | Muskos | 293/133 |
| 7,559,589 B2* | 7/2009 | Nees | 293/154 |
| 7,766,403 B2* | 8/2010 | Alvarsson et al. | 293/133 |
| 8,056,926 B2* | 11/2011 | Okabe et al. | 280/784 |
| 8,152,211 B2* | 4/2012 | Klimek | 293/102 |
| 8,162,334 B2* | 4/2012 | Kondou et al. | 280/124.108 |
| 8,172,286 B2* | 5/2012 | Klimek | 293/133 |
| 8,215,686 B2* | 7/2012 | Czopek et al. | 293/133 |
| 8,246,069 B2* | 8/2012 | Ladzinski et al. | 280/495 |
| 2002/0121793 A1* | 9/2002 | Rice | 296/35.1 |
| 2003/0057723 A1* | 3/2003 | Rice | 296/35.1 |
| 2004/0207217 A1* | 10/2004 | Muller et al. | 293/133 |
| 2007/0176443 A1* | 8/2007 | Yasuhara et al. | 293/133 |
| 2008/0042455 A1* | 2/2008 | Nees | 293/132 |
| 2011/0285107 A1* | 11/2011 | Ladzinski et al. | 280/495 |
| 2012/0007373 A1* | 1/2012 | Boettcher et al. | 293/132 |

FOREIGN PATENT DOCUMENTS

| | | |
|---|---|---|
| DE | 69900952 T2 | 1/2005 |
| DE | 10359483 A1 | 7/2005 |
| DE | 102004046585 A1 | 4/2006 |
| DE | 102004056249 A1 | 5/2006 |
| DE | 102005056578 A1 | 6/2007 |
| DE | 202007018727 U1 | 4/2009 |
| FR | 2869263 A1 | 10/2005 |
| WO | 2011075031 A1 | 6/2011 |

OTHER PUBLICATIONS

German Patent Office, German Search Report for Application No. 102010024572.0, dated Feb. 7, 2011.

UK IPO, British Search Report for Application No. 1109472.9, dated Sep. 15, 2011.

* cited by examiner

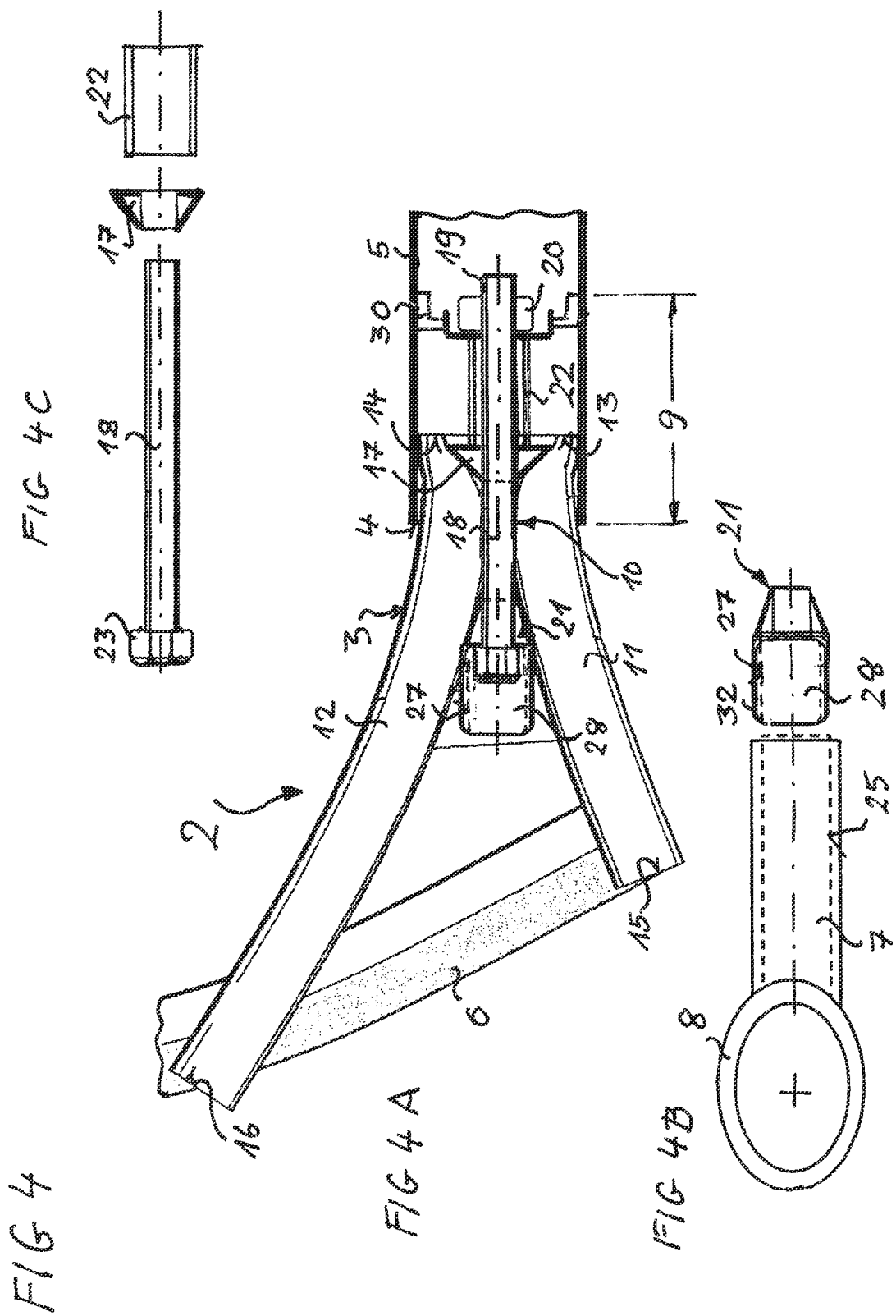

IMPACT-DAMPING STRUCTURE WITH CRASH BOXES

CROSS-REFERENCE TO RELATED APPLICATION

This application claims priority to German Patent Application No. 102010024572.0, filed Jun. 22, 2010, which is incorporated herein by reference in its entirety.

TECHNICAL FIELD

The technical field relates to an impact-damping structure with crash boxes involving an extension of the ends of chassis members of a vehicle to a transverse impact member.

BACKGROUND

Impact-damping structures with crash boxes are used in motor vehicles for enhancing safety. In addition, damage to the body structure of the vehicle caused by accidents at low speeds can be diminished using these crash boxes. To this end, the crash boxes are designed as deformation bodies integrated into the motor vehicle in such a way that their deformation partially absorbs the impact energy that arises when the motor vehicle collides with an obstacle. The crash boxes thereby diminish the transfer of impact energy to the body structure, in particular to the two vehicle chassis members, and can in so doing limit or entirely prevent damage thereto.

Such an impact-damping structure is known from publication U.S. Pat. No. 7,000,975 B2. To this end, the known impact-damping structure exhibits a damping support that takes the form of a crash box serving as a transition to a reinforced transverse impact member at the end of a lateral chassis member of the vehicle body, and is arranged between the reinforced transverse impact member and the end of the lateral chassis member. To this end, the damping support exhibits a front connecting wall, which is fixed to the reinforced transverse impact member, and a rear connecting wall flanged to the end of the chassis member. The front and rear connecting walls are joined together by a plurality of connecting ribs, and an outer and inner rib are fixed on the front connecting wall at a respectively acute angle.

The disadvantage to this impact-damping structure with its front and rear connecting walls is that these connecting walls block any and all access to the interior of the chassis member. The end of the chassis member is rather bent open like a flange for flanging the rear connecting wall while covering the inner profile of the chassis member. A towing lug that aligns flush with a chassis member cannot be attached without weakening the crash box or damping support.

At least one object is to provide an impact-damping structure with crash box that overcomes the disadvantages of prior art, and enables the attachment of a towing lug to elongate one of the chassis members. In addition, other objects, desirable features and characteristics will become apparent from the subsequent summary and detailed description, and the appended claims, taken in conjunction with the accompanying drawings and this background.

SUMMARY

One embodiment providing an impact-damping structure with crash boxes to elongate the ends of chassis members of a vehicle to a transverse impact member. An extension pipe with a towing lug that aligns flush with the chassis member is arranged in a center of one of the crash boxes. The extension pipe with towing lug is connected with the end of the chassis member via a spreading device of the crash box.

The advantage to attaching a towing lug to the extension pipe aligning flush with the chassis member is that the towing forces to be conveyed via the towing lug to the vehicle to be towed are directly transferred to one of the chassis members of the vehicle frame. Another advantage to joining the extension pipe with a spreading device of the crash box is that the anchoring of the crash box in the chassis member can be used without having to additionally fix an extension pipe for a towing lug in the area of the end of the chassis member.

It is provided for the impact-damping structure that use be made of a crash box having two legs forced apart by the spreading device, which together with the first ends are fixed in an end region of the chassis member of the vehicle via spreading. In this embodiment, a non-positive connection with the end region is present inside the chassis member of the vehicle due to this spreading.

The advantage to the above relative to fixing the crash box according to the aforementioned prior art is that the impact-damping structure can be fixed to the end region of the chassis member using distinctly fewer screw connections, and hence less assembly outlay. It is here provided that the legs of the crash box be spread in a V shape relative to the transverse impact member, and fixed with their second ends to the transverse impact member.

The advantage to the above is not just that this impact-damping structure can absorb the impact energy of a frontal collision, but also dampen impact directions at an angle relative to a frontal collision with these crash boxes spread in a V shape. To this end, it is provided that the spreading device is arranged between the two legs in the end region of the chassis member, and the spreading device forces apart the first ends of the legs in the end region of the chassis member with an inner spreading wedge. This inner spreading wedge abuts with a spacer sleeve against a reinforced section within the end region of the chassis member, so that when the two legs spreading in a V shape relative to the transverse impact member are introduced, they are forced apart by the spreading wedge, which becomes wedged between the first ends of the legs.

Also provided for the spreading device is an outer, conical clamping wedge, which interacts with the inner conical spreading wedge between the legs of the V-shaped crash box, wherein the outer, conical clamping wedge and inner, conical spreading wedge are tensioned relative to each other. This tensioning forces apart the first two ends of the legs arranged in the end region of the chassis member, and establishes the non-positive connection between the crash box and end region of the chassis member.

It is further provided that the inner spreading wedge supported against a spacer sleeve is arranged on a screw element, the screw element of the spreading device forces the inner spreading wedge between the first ends of the legs as the spreading wedge is supported on the spacer sleeve while the screw element is tightened. The outer clamping wedge here interacts with a screw head of the screw element in that the screw head engages the outer clamping wedge, and the screw element is screwed into a nut fixed in a torsion-proof manner in the end region of the chassis member. This torque-proof nut fixed in the end region of the chassis member is joined with the chassis member via a reinforced section in the end region. It is provided that a long stretched out stress bolt be used for this purpose.

The extension pipe that aligns flush with the chassis member is arranged between the legs of the crash box spread in a V shape. The V shape of the spread legs of the crash box makes it possible to arrange the spreading device with the towing lug aligned centrally relative to the end region of the chassis member using the spreading device for the legs spread in a V shape. This ensures that the towing force to be conveyed via the towing lug and extension pipe to the vehicle to be towed is introduced into the end region of the chassis member of the vehicle frame via the spreading device of the crash box.

In another embodiment, the extension pipe with towing lug is detachably connected with the spreading device. The advantage to this is that the towing lug under the transverse impact member can project out of the front region of the vehicle in a readily accessible manner. In addition, it is provided that the spreading device exhibits a screw element, with which the extension pipe is engaged or can be engaged. To this end, it is provided that the screw head of the screw element exhibits a male thread and the extension pipe exhibits a female thread, which is screwed onto the male thread of the screw head of the screw element.

While the screw element exhibits a screw head with an Allen wrench profile so as to apply the clamping forces between the spreading wedge and clamping wedge of the tensioning device, the male thread can be screwed onto the screw head of the extension pipe with towing lug at any time during a towing operation, and then screwed off and stowed again for normal driving.

As an alternative, it is also possible for the outer clamping section to exhibit a male thread on which the extension pipe with towing lug is screwed, and for the outer clamping wedge to exhibit a cavity that accommodates the screw head of the screw element. If this cavity sets aside enough space for a six-point socket wrench, a simple hexagon screw head can also be provided as the screw head. If the provided cavity in the clamping wedge with male thread is inadequate for a six-point socket wrench, this screw head can also exhibit an Allen wrench profile, which always allows the screw element for applying the pre-stress for the spreading device to be tightened and fixed. In addition, it is possible to provide the nut for the screw element fixed in the end region of the chassis member as a self-retaining nut, or arrange self-retaining shims under the screw head.

BRIEF DESCRIPTION OF THE DRAWINGS

The present invention will hereinafter be described in conjunction with the following drawing figures, wherein like numerals denote like elements, and:

FIGS. 4A-4C show a view of an impact-damping structure according to a second embodiment.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
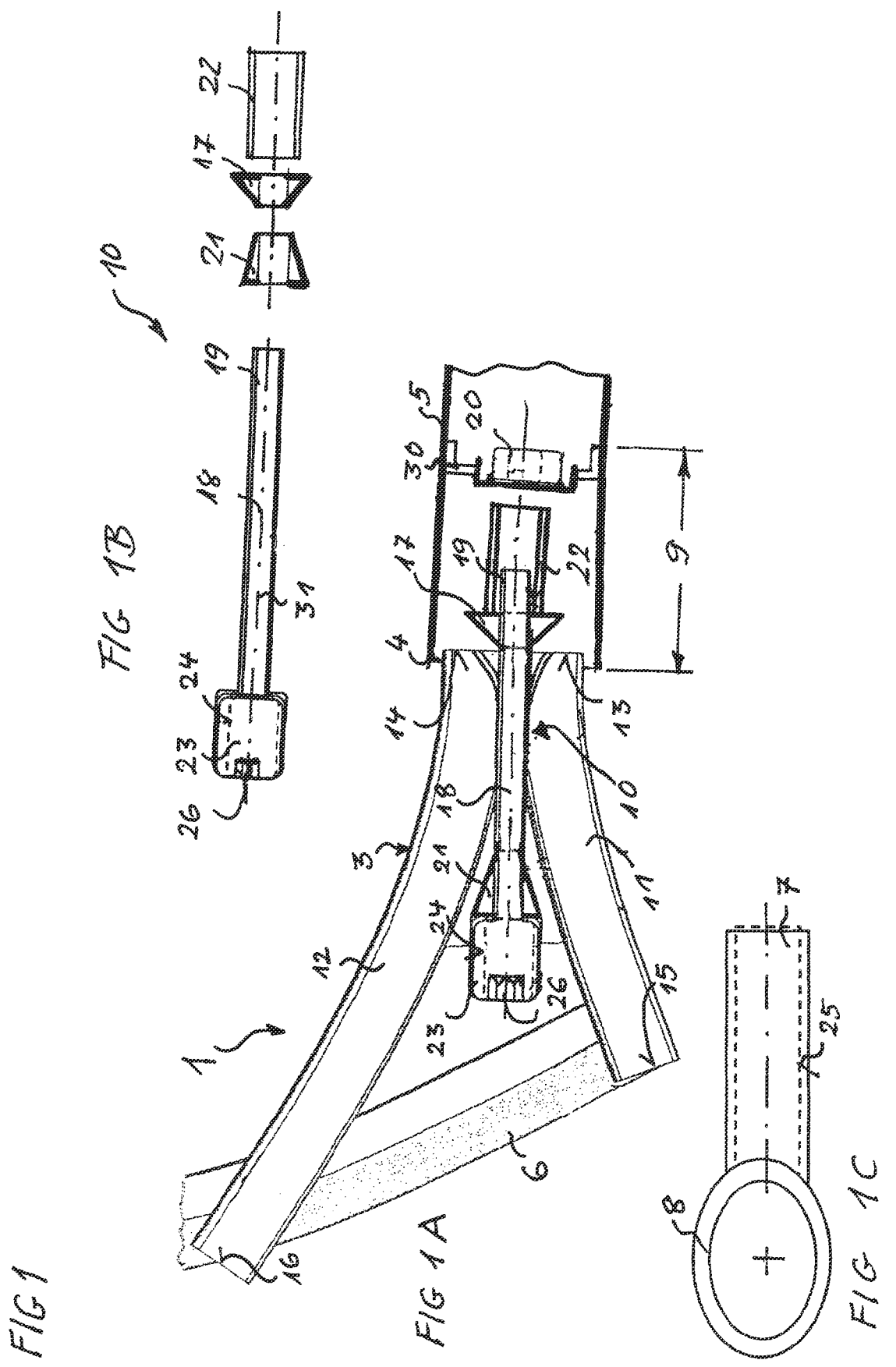
FIGS. 1A-1C show a partially exploded, schematic view of an impact-damping structure according to an embodiment.

FIGS. 1A, 1B and 1C on FIG. 1 show a partially exploded, schematic view of the components of an impact-damping structure 1 prior to assembly in an end region 9 of a chassis member 5. A crash box 3 exhibiting two legs 11 and 12 spread in the shape of a V is introduced by way of preparation into an open end 4 of the chassis member 5 of a vehicle frame. Components of a spreading device 10 are also arranged between the legs 11 and 12 by way of preparation, so that this spreading device aligns flush with the chassis member 5, and is arranged centrally in the end region 9 of the chassis member 5. The end region 9 of the chassis member 5 also exhibits a reinforced section 30, which fixes a nut 20 of the spreading device 10 in a torsion-proof manner. This nut 20 can be a self-retaining nut, so as to prevent the spreading device from detaching during the assembly of the latter.

The components of the spreading device 10 are depicted on FIG. 1B in an exploded view. The clamping force for the spreading device is generated by means of a screw element 18, which can be designed as a stress bolt, and exhibits a threaded projection 19. A screw head 23 of the screw element 18 exhibits an Allen key profile 26 on the one hand, so that the clamping force for the spreading device can be imparted to the screw element 18 by means of an Allen key. In addition, the screw head 23 exhibits a male thread 24, onto which an extension pipe 7 with female thread 25 and towing lug 8 shown on FIG. 1C can be screwed.

Further evident on FIG. 1B is an outer clamping wedge 21, which can be screwed or slipped onto a screw shank 31 outside the end region 9 of the chassis member 5, before the screw shank 31 is shoved through the two legs 11 and 12 of the crash box 3. The spreading wedge 17 depicted on FIG. 1B is slipped onto the threaded projection 19 with a spacer sleeve 22, wherein the spacer sleeve 22 abuts against the reinforced section 30 for the nut 20 anchored in a torsion-proof manner as the first ends 13 and 14 of the legs 11 and 12 are pushed into the end region 9 of the chassis member, as shown on FIG. 1A. As soon as the screw element 18 has engaged with the nut 20, the spacer sleeve presses the spreading wedge 17 between the ends 13 and 14 of the correspondingly pre-shaped legs 11 and 12 of the crash box 3. The next figure shows the result.

Figure 2:
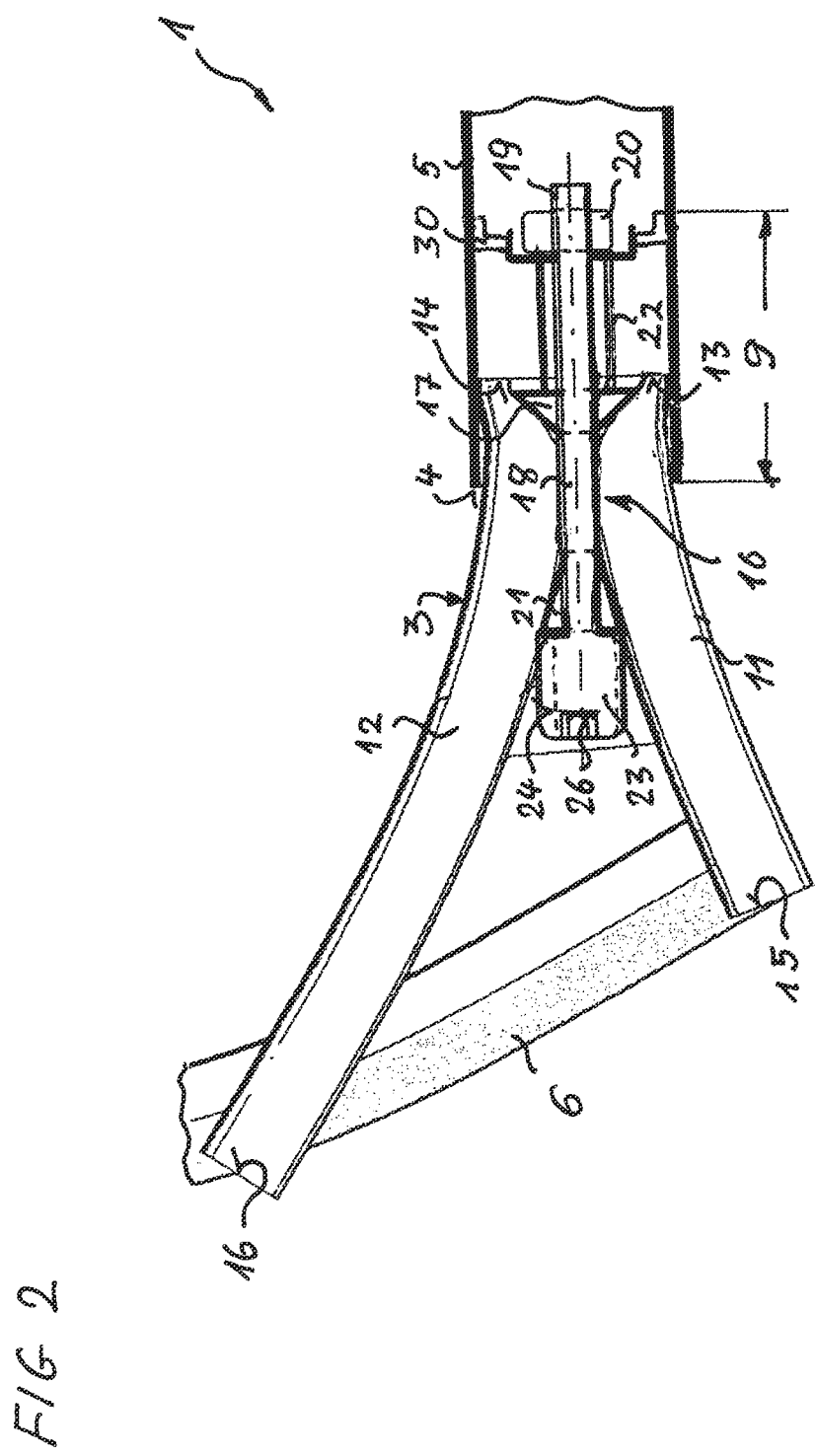
FIG. 2 shows a schematic view of the assembled impact-damping structure according to FIG. 1.

FIG. 2 shows a diagrammatic view of the assembled impact-damping structure according to FIG. 1. The ends 13 and 14 of the legs 11 and 12 spread in the shape of a V are forced apart by the inner spreading wedge 17 in the end region 9 of the chassis member 5 of a vehicle frame, and establish fraction with the open end 4 in the end region 9 of the chassis member 5. The front ends 15 and 16 are fixed to the transverse impact member 6, so that the transverse impact member 6 is non-positively joined via the crash box 3 with the chassis member 5 via the crash box 3.

Figure 3:
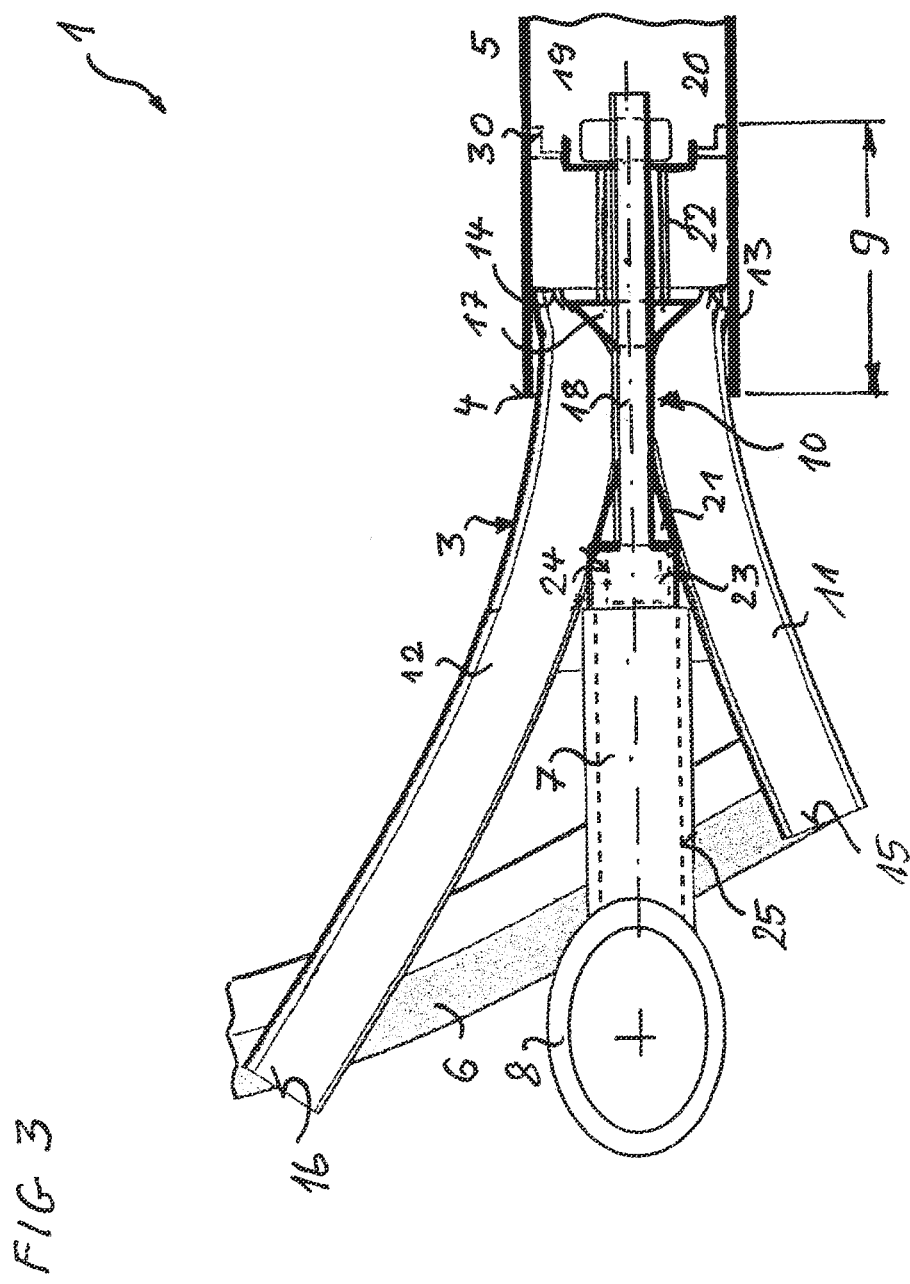
FIG. 3 shows a schematic view of the assembled impact-damping structure according to FIG. 2, with screwed on towing lug.

Since the screw head 23 has a male thread 24, the extension pipe 7 with towing lug 8 shown on FIG. 1 can now be screwed onto this male thread 24 as required, as depicted on the following figure. FIG. 3 shows a diagrammatic view of the assembled impact-damping structure according to FIG. 2 with screwed-on towing lug. Components with the same functions as in the preceding figures are labeled with the same reference numbers, and not explained in any greater detail.

As depicted on FIG. 3, the towing lug 8 is arranged in a readily accessible manner in front of the transverse impact member. The extension pipe 7 to which the towing lug 8 is fixed aligns flush with the transverse impact member 6 of the vehicle frame after the latter has been screwed onto the male thread 24 of the screw head 23 of the screw element 18.

FIGS. 4A, 4B and 4C of FIG. 4 show a view of an impact-damping structure 2 according to a second embodiment. Components with the same functions as in the preceding figures are labeled with the same reference numbers and not explained in any greater detail. The difference from the first embodiment lies in the fact that, as shown on FIG. 4B, the outer clamping wedge 21 passes over into a pipe socket 32, which exhibits a male thread 27 and cavity 28. This cavity 28 is configured in such a way that the screw head 23 of a screw element 18 shown on FIG. 4C can be arranged therein, in order to fix the spreading device depicted on FIG. 4A in the end region 9 of the chassis member 5. If the cavity 28 is not sufficient for securing a socket wrench on the screw head shown on FIG. 4C, the screw head 23 can also exhibit an Allen wrench profile. The pipe socket 32 with male thread 27 provides the opportunity to screw an extension pipe 7 with female thread 25 and towing lug 8 depicted on FIG. 4 onto the spreading device 10 shown on FIG. 4A, if needed.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An impact-damping structure with a crash box involving an extension of an end of a chassis member of a vehicle to a transverse impact member, comprising:
    an extension pipe with a towing lug arranged in a center of the crash box; and
    a spreading device of the crash box configured to connect the extension pipe with the end of the chassis member,
    wherein the crash box comprises two legs forced apart by the spreading device, which together with a first end are fixed in an end region of the chassis member of the vehicle via spreading.

2. The impact-damping structure according to claim 1, wherein the extension pipe with the towing lug is detachably connected with the spreading device.

3. The impact-damping structure according to claim 1, wherein the two legs of the crash box are spread in a V shape relative to the transverse impact member and fixed with second ends to the transverse impact member.

4. The impact-damping structure according to claim 1, wherein the extension pipe is configured to align in a substantially flush manner with the chassis member, and is arranged between the two legs of the crash box forced apart in a V shape.

5. The impact-damping structure according to claim 1, wherein the spreading device arranged between the two legs in the end region of the chassis member, and
    wherein the spreading device forces apart the first end of the two legs in the end region of the chassis member with an inner spreading wedge.

6. The impact-damping structure according to claim 5, wherein an outer, conical clamping wedge and an inner and conical spreading wedge are arranged between the two legs in the V shape and tensioned relative to each other.

7. The impact-damping structure according to claim 6, wherein the inner spreading wedge is supported against a spacer sleeve that incorporates a screw element, and
    wherein the inner spreading wedge forces apart the first end of the two legs of the crash box in the end region inside the chassis member.

8. The impact-damping structure according to claim 7, wherein an outer clamping wedge is configured to interact with a screw head of the screw element.

9. The impact-damping structure according to claim 8, wherein the screw head of the screw element comprises a male thread and the extension pipe comprises a female thread screwed onto the male thread of the screw head of the screw element.

10. The impact-damping structure according to claim 1, wherein the spreading device comprises a screw element configured to engage the extension pipe.

11. The impact-damping structure according to claim 10, wherein the screw element is a long stretched out stress bolt having a threaded projection configured to engage a nut in an end region of the chassis member.

12. The impact-damping structure according to claim 11, wherein the nut fixed in the torsion-proof manner in the end region of the chassis member and joined with the chassis member with a reinforced section in the end region.

13. The impact-damping structure according to claim 11, wherein the screw element comprises a screw head with an Allen wrench profile.

14. The impact-damping structure according to claim 13, wherein an outer clamping wedge comprises a male thread on which the extension pipe with the towing lug can be screwed, and the outer clamping wedge comprises a cavity that incorporates the screw head of the screw element.

* * * * *